United States Patent
Hogan et al.

(10) Patent No.: US 11,332,556 B2
(45) Date of Patent: May 17, 2022

(54) METHODS OF MAKING POLYMERS WITH REDUCED TACK, AND RUBBER COMPOSITIONS INCORPORATING THESE POLYMERS

(71) Applicant: Firestone Polymers, LLC, Akron, OH (US)

(72) Inventors: Terrence E. Hogan, Uniontown, OH (US); Gabrielle L. McIntyre, Akron, OH (US); Wei Zhao, Guangzhou (CN)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 208 days.

(21) Appl. No.: 16/474,403

(22) PCT Filed: Dec. 21, 2017

(86) PCT No.: PCT/US2017/067778
§ 371 (c)(1),
(2) Date: Jun. 27, 2019

(87) PCT Pub. No.: WO2018/125733
PCT Pub. Date: Jul. 5, 2018

(65) Prior Publication Data
US 2020/0172639 A1 Jun. 4, 2020

Related U.S. Application Data

(60) Provisional application No. 62/439,639, filed on Dec. 28, 2016.

(51) Int. Cl.
| | | |
|---|---|---|
| *C08F 8/42* | (2006.01) | |
| *C08F 236/10* | (2006.01) | |
| *C08G 77/18* | (2006.01) | |
| *C08L 83/10* | (2006.01) | |
| *C08G 77/14* | (2006.01) | |

(52) U.S. Cl.
CPC ............. *C08F 8/42* (2013.01); *C08F 236/10* (2013.01); *C08G 77/14* (2013.01); *C08G 77/18* (2013.01); *C08L 83/10* (2013.01); *C08F 2810/30* (2013.01)

(58) Field of Classification Search
CPC ...... C08F 8/42; C08F 2/06; C08F 4/48; C08F 236/06; C08F 236/10; C08F 136/06; C08F 2810/30; C08G 77/14; C08G 77/18; C08G 77/442; C08L 2666/44; C08L 83/10
See application file for complete search history.

(56) References Cited

U.S. PATENT DOCUMENTS

| | | | | |
|---|---|---|---|---|
| 5,659,056 | A * | 8/1997 | Hergenrother | ............ C08C 2/04 |
| | | | | 526/340 |
| 6,255,404 | B1 * | 7/2001 | Hogan | ............ C08C 19/44 |
| | | | | 525/326.5 |
| 6,279,632 | B1 * | 8/2001 | Hogan | ............ C08C 19/42 |
| | | | | 152/450 |
| 9,365,660 | B2 | 6/2016 | Yan et al. | |
| 9,428,628 | B2 | 8/2016 | Ma | |
| 2008/0171827 | A1 * | 7/2008 | Hogan | ............ C08L 15/00 |
| | | | | 524/570 |
| 2011/0077325 | A1 * | 3/2011 | Luo | ............ C08F 236/06 |
| | | | | 523/152 |
| 2012/0065319 | A1 | 3/2012 | Backer et al. | |
| 2013/0165578 | A1 | 6/2013 | Francik et al. | |
| 2014/0121316 | A1 | 5/2014 | Monsallier et al. | |
| 2014/0357795 | A1 | 12/2014 | McCauley et al. | |
| 2015/0166700 | A1 | 6/2015 | Pawlow | |
| 2015/0166737 | A1 | 6/2015 | Nakatani et al. | |
| 2016/0075809 | A1 | 3/2016 | Steinhauser et al. | |
| 2016/0340447 | A1 | 11/2016 | Luo | |
| 2016/0369063 | A1 | 12/2016 | Matmour et al. | |
| 2021/0238336 | A1 * | 8/2021 | Abell | ............ C08F 236/10 |
| 2021/0340286 | A1 * | 11/2021 | Askey | ............ C08C 19/25 |

FOREIGN PATENT DOCUMENTS

| | | |
|---|---|---|
| EP | 1790666 A1 | 5/2007 |
| JP | 2010254782 A | 11/2010 |
| JP | 2012201863 A | 10/2012 |
| JP | 2014055264 A | 3/2014 |
| WO | 0210267 A2 | 2/2002 |

OTHER PUBLICATIONS

Cichomski, Ernest, "Silica-Silane Reinforced Passenger Car Tire Treads, Effect of Silica Morphology, Silica-Polymer Interface Structure and Rubber Matrix Network on tire-Performance Indicators", doctoral dissertation at the University of Twente, 2015.
International Search Report and Written Opinion pertaining to PCT/US2017/067778, dated Apr. 12, 2018.
Japanese Office Action issued by the Japanese Patent Office for Japanese Application No. 2019-534341 dated Aug. 17, 2020 (6 pages total for combined document with English translation).
European Extended Search Report for Application No. 17888920.0 dated Jul. 8, 2020.

* cited by examiner

*Primary Examiner* — Jane L Stanley

(74) *Attorney, Agent, or Firm* — Meredith E. Hooker; Joshua A. Lorentz

(57) ABSTRACT

Embodiments of the present disclosure are directed to methods of preparing an alkoxysilane functionalized polymer, the method comprising: introducing an anionic polymerization initiator to a reactor comprising a reactive mixture including conjugated diolefin monomer and solvent to form a living polymer via anionic polymerization; introducing alkoxysilane to the reactor to mix with the living polymer to form an alkoxysilane functionalized polymer; adding at least one aliphatic carboxylic acid having at least 10 carbons to the alkoxysilane functionalized polymer; and removing solvent from the alkoxysilane functionalized polymer.

13 Claims, 2 Drawing Sheets

METHODS OF MAKING POLYMERS WITH REDUCED TACK, AND RUBBER COMPOSITIONS INCORPORATING THESE POLYMERS

CROSS-REFERENCE TO RELATED APPLICATIONS

This application is a 35 U.S.C. § 371 national stage application of International Application No. PCT/US2017/067778, filed Dec. 21, 2017, which claims priority to U.S. Provisional Application No. 62/439,639, filed Dec. 28, 2016, which are both incorporated by reference herein in their entireties.

TECHNICAL FIELD

Embodiments of the present disclosure are generally related to methods of producing stabilized polymers via anionic polymerization, and are specifically related to methods of producing stabilized alkoxysilane functionalized polymers by adding least one aliphatic carboxylic acid having at least 10 carbons to reduce tack or stickiness in the polymer.

BACKGROUND

Controlling Mooney viscosity is a major consideration for rubber manufacturing. To terminate the anionic polymerization, the terminal ends of the living polymers are often capped with functional groups. This leads to an increase in Mooney viscosity; however, these terminal ends can often undergo further hydrolysis, condensation, and coupling, which can increase Mooney viscosity. Higher Mooney viscosity is desirable during polymer production to improve processing. However, high Mooney viscosity polymers can make the rubber compound unsuitable due to processing concerns (e.g., poor extrusion). As a result, viscosity stabilizing agents are often added to allow production and processing of higher viscosity polymer at the polymer plant and tire plant.

While various components may be added to control the Mooney viscosity, the tack of the polymers can also create issues with rubber processing equipment. Specifically, this high tack can lead to fouling and plugging of the equipment. Because of this tackiness, process equipment often needs to be taken offline, before it can be re-used.

Accordingly, there is a continual need for tack reduction in copolymers used in rubber compositions.

SUMMARY

Embodiments of the present disclosure are directed to methods of reducing the tack of alkoxysilane functionalized polymers by addition of aliphatic carboxylic acid having at least 10 carbons, such as stearic acid.

According to one embodiment, a method of preparing an alkoxysilane functionalized polymer is provided. The method comprises: introducing an anionic polymerization initiator to a reactor comprising a reactive mixture including conjugated diolefin monomer and solvent to form a reactive polymer via anionic polymerization; introducing alkoxysilane to the reactor to react with the reactive polymer to form an alkoxysilane functionalized polymer; adding at least one aliphatic carboxylic acid having at least 10 carbons to the alkoxysilane functionalized polymer; and removing solvent from the alkoxysilane functionalized polymer.

Additional features and advantages of the embodiments described herein will be set forth in the detailed description which follows, and in part will be readily apparent to those skilled in the art from that description or recognized by practicing the embodiments described herein, including the detailed description which follows, and the claims.

DETAILED DESCRIPTION

Figure 1:
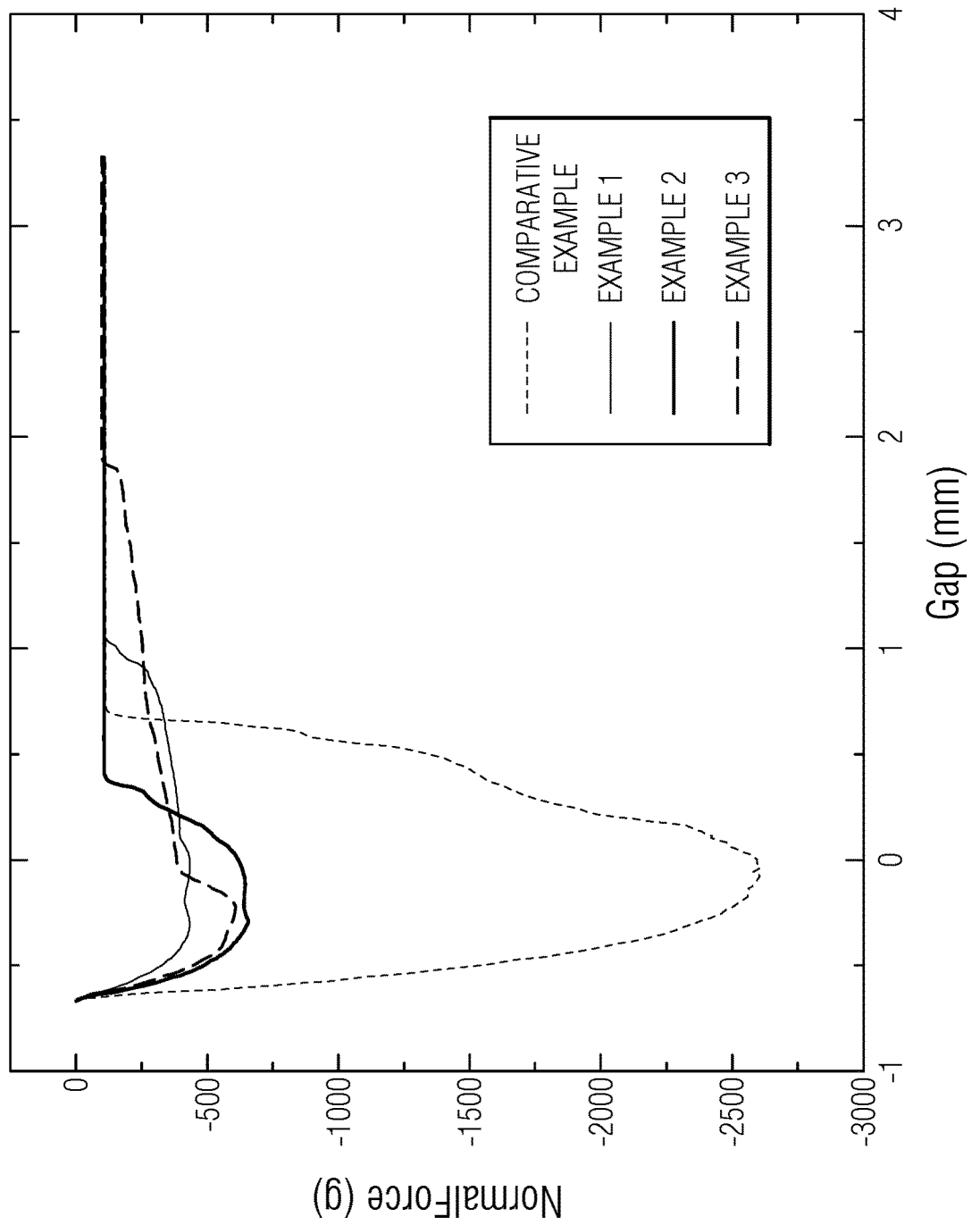
FIG. 1 is a graphical illustration of normal force required to separate styrene butadiene (SBR) copolymer samples from a metal disk in accordance with the Tack Test Method described herein.

The present disclosure will now be described by reference to more detailed embodiments, but the disclosure should not be construed as limited to the embodiments set forth herein. Rather, these embodiments are provided so that this disclosure will be thorough and complete, and will fully convey the subject matter to those skilled in the art.

Unless otherwise defined, all technical and scientific terms used herein have the same meaning as commonly understood by one of ordinary skill in the art. The terminology used in the disclosure herein is for describing particular embodiments only and is not intended to be limiting. As used in the specification and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Definitions

The terminology as set forth herein is for description of the embodiments only and should not be construed as limiting the scope of the disclosure as a whole.

As used herein, the term "phr" means the parts by weight of rubber. If the rubber composition comprises more than one rubber, "phr" means the parts by weight per hundred parts of the sum of all rubbers.

As used herein, the term "polybutadiene" is used to indicate a polymer that is manufactured from 1,3-butadiene monomers. The term polybutadiene is also used interchangeably with the phrase "polybutadiene rubber" and the abbreviation "BR."

As used herein, the term "styrene-butadiene copolymer", "styrene-butadiene rubber" or "SBR" means a copolymer manufactured from styrene and 1,3-butadiene monomers.

As used herein, the term "natural rubber" or "NR" means naturally occurring rubber such as can be harvested from sources such as Hevea rubber trees, and non-Hevea source (e.g., guayule shrubs).

As used herein, the term "copolymer" refers to a polymer produced from two or more monomers, and thus could encompass polymers produced from two monomers or more than two monomers, such as terpolymers.

As used herein, "vinyl content" refers to the percentage of 1,2-vinyl double bonds in the polymer (e.g., the functionalized, hydrogenated copolymer).

As used herein, "rubber composition" refers to the copolymer (e.g., the functionalized, hydrogenated copolymer)

and the additional fillers and additives blended therewith for use in tire and non-tire applications.

Embodiments of the present disclosure are directed to methods of preparing an alkoxysilane functionalized polymer. The method may include introducing an anionic polymerization initiator to a reactor comprising a reactive mixture including conjugated diolefin monomer and solvent to form a reactive polymer via anionic polymerization; introducing alkoxysilane to the reactor to mix with the reactive polymer to form an alkoxysilane functionalized polymer; adding at least one aliphatic carboxylic acid having at least 10 carbons to the alkoxysilane functionalized polymer; and removing solvent from the alkoxysilane functionalized polymer.

Monomers

The conjugated diolefins may include various hydrocarbon compositions. For example, the conjugated diolefins include those having from about 4 to about 12 carbon atoms such as 1,3-butadiene, 1,3-cyclohexadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1, 3-pentadiene, 4-methyl-1,3-pentadiene, and 2,4-hexadiene, or combinations thereof. As used herein, the conjugated diolefins also may encompass trienes such as myrcene. These conjugated diolefins may be utilized to produce diene homopolymers such as polybutadiene and polyisoprene.

In further embodiments, the mixture in the reactor may also include comonomer, which may copolymerize with the conjugated diolefins to produce copolymers. The comonomer may comprise vinyl aromatic hydrocarbons having from about 8 to about 20 carbon atoms, or from about 8 to 10 carbon atoms. These vinyl aromatic hydrocarbons may include monovinyl aromatic hydrocarbons. In one or more embodiments, the vinyl aromatic monomers may comprise styrene, alpha-methyl styrene, 1-vinylnaphthalene, 2-vinylnaphthalene, 1-alpha-methylvinylnaphthalene, 2-alphamethyl-vinylnaphthalene, and mixtures of these as well as halo, alkoxy, alkyl, cycloalkyl, aryl, alkaryl and aralkyl derivatives thereof. Examples of these latter compounds include 4-methylstyrene, vinyl toluene, 3,5-diethylstyrene, 2-ethyl-4-benzylstyrene, 4-phenylstyrene, 4-para-tolylstyrene, and 4,5-dimethyl-1-vinylnaphthalene, or mixtures thereof.

The polymers produced may include diene homopolymers and copolymers thereof with vinyl aromatic comonomers. In one or more embodiments, the produced polymers may be diene homopolymers such as polybutadiene and polyisoprene, or copolymers such as styrene butadiene rubber (SBR). The copolymers may be random copolymers or block copolymers. Block copolymers include, but are not limited to, poly(styrene-butadiene-styrene), which are thermoplastic polymers.

For the copolymer embodiments, the copolymers may comprise from 20 to 100% by weight, or about 40 to 90% by weight of the conjugated diolefin monomers. Conversely, the copolymers may comprise from 0 to about 80% by weight, or about 10 to about 60% by weight of vinyl aromatic monomers. The copolymers may be random copolymers or block copolymers. In one embodiment, the conjugated diolefin monomer is 1,3-butadiene and the vinyl aromatic monomer is styrene, which copolymerize to produce styrene butadiene copolymers. In specific embodiments, the copolymer is a random styrene butadiene copolymer.

Solvents

The polymerizations of the present disclosure may be conducted in the presence of solvent, for example, inert solvent. The term "inert solvent" means that the solvent does not enter into the structure of the resulting polymer, does not adversely affect the properties of the resulting polymer, and does not adversely affect the activity of the catalyst employed. Suitable inert solvents include hydrocarbon solvents which may contain aliphatic, aromatic or cycloaliphatic hydrocarbons such as hexane, pentane, toluene, benzene, cyclohexane and the like. Ethers such as tetrahydrofuran and tertiary amines such as triethylamine and tributylamine may also be used as solvents, but these may modify the polymerization as to styrene distribution, vinyl content and rate of reaction. In one or more embodiments, the solvents may comprise hexane, or blends and mixtures of hexanes (e.g., linear and branched), for example, cyclohexane alone or mixed with other forms of hexane.

Anionic Polymerization Initiator

Various anionic polymerization initiators are contemplated for the anionic polymerization processes of the present disclosure. The anionic polymerization initiator may comprise a lithium catalyst, specifically, an organolithium anionic initiator catalyst. The organolithium initiator employed may be any anionic organolithium initiators useful in the polymerization of conjugated diolefin monomers (e.g., 1,3-butadiene monomers). In general, the organolithium compounds include hydrocarbon containing lithium compounds of the formula R(Li)x wherein R represents hydrocarbon groups containing from one to about 20 carbon atoms, and preferably from about 2 to about 8 carbon atoms, and x is an integer from 1 to 2. Although the hydrocarbon group is preferably an aliphatic group, the hydrocarbon group may also be cycloaliphatic or aromatic. The aliphatic groups may be primary, secondary, or tertiary groups although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octa-decyl. The aliphatic groups may contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like. Mixtures of different lithium initiator compounds also can be employed such as those containing one or more lithium compounds such as R(Li)x, R and x as defined above. Other lithium catalysts which can be employed alone or in combination with the hydrocarbyl lithium initiators are tributyl tin lithium, lithium dialkyl amines, lithium dialkyl phosphines, lithium alkyl aryl phosphines and lithium diaryl phosphines. In one embodiment, the organolithium initiator is n-butyl lithium.

The amount of initiator required to effect the desired polymerization can be varied over a wide range depending upon a number of factors such as the desired polymer molecular weight, the desired 1,2- and 1,4-content of the conjugated diene, and the desired physical properties for the polymer produced. In general, the amount of initiator utilized may vary from as little as 0.2 millimole of lithium per 100 grams of monomers up to about 100 millimoles of lithium per 100 grams of monomers, depending upon the desired polymer molecular weight (typically 1,000 to 10,000,000 grams/mole average molecular weight).

Polymerization is begun by introducing the monomer(s) and solvent to a suitable reaction vessel, followed by the addition of the anionic polymerization initiators. The polymerization reaction may be carried out in a batch polymerization reactor system or a continuous polymerization reactor system. Polymerization conditions such as temperature, pressure and time are well known in the art for polymerizing the monomers as described with the anionic polymerization initiator as described. For example, for illustrative purposes only, the temperature employed in the polymerization is generally not critical and may range from about −60° C. to about 150° C. Exemplary polymerization temperatures may range from about 25° C. to about 130° C. for a polymerization time of a few minutes to up to 24 hours or more, and employing pressures generally sufficient to maintain polymerization admixtures substantially in the liquid phase. The procedure may be carried out under anhydrous, anaerobic conditions. Polymerization of any of the above-identified monomers in the presence of an organolithium initiator results in the formation of a "living" polymer. Throughout formation or propagation of the polymer, the polymeric structure may be anionic and living. In other words, a carbon anion is present. A new batch of monomer subsequently added to the reaction can add to the living ends of the existing chains and increase the degree of polymerization. A living polymer or copolymer, therefore, may include a polymeric segment having an anionic reactive end.

Functional Groups

Functional groups may then be applied to the anionic reactive end of the living polymer to cap or terminate the living polymer. Various alkoxysilanes are considered suitable for the functional groups. In one or more embodiments, the alkoxysilanes bonded to polymers are silane terminated polymers represented by the following formula:

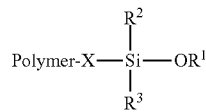

wherein X may be present or not present and represents a linking atom, chemical bond, or a linking group (e.g., oxygen, sulfur, etc.), and wherein $R^1$ is a $C_1$ to $C_{18}$ alkyl, Q to $C_{18}$ alkyl group containing a heteroatom such as nitrogen or oxygen, $C_4$ to $C_8$ cycloalkyl, or $C_6$ to $C_{18}$ aromatic group, and $R^2$ and $R^3$ may be the same or different and are selected from the group consisting of —$OR^1$, a Q to $C_{18}$ alkyl, $C_4$ to $C_8$ cycloalkyl, or $C_6$ to $C_{18}$ aromatic group. In one embodiment, the functional group comprises 3-(1,3,-dimethylbutyl-idene)aminopropyltriethoxysilane, represented in the above formula by $R^1$ being $C_2$, forming an ethoxy group, $R^2$ being the same group as $OR^1$ and $R^3$ being a 3-(1,3-dimethylbutyl-idene) aminopropyl group.

In further embodiments, the alkoxysilane compounds may comprise trimethoxysilane compositions, such as 2-(3,4-epoxycyclohexyl)ethyltrimethoxysilane, methyltrimethoxysilane, 3-glycidylpropyltrimethoxysilane, γ-glycidoxypropyltrimethoxysilane, or 3-(1,3-dimethylbutylidene) aminopropyltriethoxysilane. Additionally, the alkoxysilyl compositions may include tetraethylorthosilicate, 3-glycidylpropylmethyldimethoxysilane, or combinations thereof. A suitable commercial example of the alkoxysilane compound may be Sila-Ace S340, a N-(1,3-dimethylbutyl-idene)-3-(triethoxysilyl)-1-propanamine produced by Chisso Corporation The polymerization conditions may dictate how much of the functional group is added. In one or more embodiments, the functional group may be present in a molar ratio (to initiator) of about 0.25 to 2, or about 0.3 to 1.

Additional Polymerization Ingredients

Additionally, in order to promote randomization in copolymerization and to control vinyl content, one or more polymeric modifiers may optionally be added to the polymerization ingredients. Amounts of polymeric modifier may range from 0 to about 90 or more equivalents per equivalent of initiator (e.g., lithium catalyst). Compounds useful as polymeric modifiers are typically organic and include those having an oxygen or nitrogen hetero-atom and a non-bonded pair of electrons. Examples include dialkyl ethers of mono and oligo alkylene glycols, "crown" ethers, tertiary amines such as tetramethyethylene diamine (TMEDA), tetrahydrofuran (THF), 2,2-bis(2'-tetrahydrofuryl)propane, THF oligomers linear and cyclic oligomeric oxolanyl alkanes (e.g., cyclic oligomeric oxolanyl propanes) and the like. Additional embodiments of the oxolanyl compounds used as polymeric modifiers and details therewith are provided in U.S. Pat. No. 9,309,330, which is incorporated by reference herein in its entirety. In one or more embodiments, the polymeric modifiers may include cyclic oligomeric oxolanyl propanes, potassium t-amylate (KTA), or combinations thereof.

The process of the present disclosure may optionally also include a stabilizing agent, for example, a silane stabilizing agent used to stabilize the Mooney viscosity. The silane stabilizing agent may be selected from the group consisting of alkyl alkoxysilanes of the structural formula $$R^1{}_nSi(OR^2)_{4-n}$$

wherein $R^1$ is selected from the group consisting of $C_1$ to $C_{20}$ alkyl, $C_4$ to $C_{10}$ cycloalkyl, or $C_5$ to $C_{20}$ aromatic groups, wherein $R_2$ may be the same as or different from $R_1$ or other $R_2$, if any, and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3, prior to contacting the polymer with water. One suitable silane stabilizing agent is octyltriethoxysilane. Additional embodiments of silane stabilizing agents and details therewith are provided in U.S. Pat. No. 6,255,404, which is incorporated by reference herein in its entirety.

Moreover, an antioxidant such as 2,6-di-t-butyl-4-methylphenol (also called butylated hydoxytoluene (BHT)) may be added to reduce the likelihood of Mooney viscosity instability due to oxidative coupling. The stabilizing agent may be added to the reactor or another mixer downstream of the reactor. Similarly, the antioxidant may be added to the reactor or another mixer downstream of the reactor. Alcohols such as methanol or isopropanol may also be used to assist in the termination step.

Aliphatic Carboxylic Acid

After the anionic polymerization and the alkoxysilane functionalization steps have commenced, at least one aliphatic carboxylic acid having at least 10 carbons is mixed with the alkoxysilane functionalized polymer. Without being bound by theory, the aliphatic carboxylic acid catalyzes hydrolysis and condensation of the alkoxysilane functionalized polymer, increasing the Mooney viscosity. In addition to increasing the viscosity, the aliphatic carboxylic acid was surprisingly found to reduce the tackiness of the alkoxysilane functionalized polymer. Shorter chain aliphatic carboxylic acids (<10 carbon) increased viscosity without reducing tackiness.

Various aliphatic carboxylic acid having at least 10 carbons are considered suitable. Without being limited to theory, the polar hydrophilic carboxylic acid terminal group in combination with the hydrophobic hydrocarbon chain of at least 10 carbons has been found effective to reduce tackiness in the alkoxysilane functionalized polymer. While conventional carboxylic acids, such as 2-ethyl hexanoic acid or acetic acid, have been used to catalyze condensation, these shorter hydrocarbon chains are ineffective to reduce tackiness. In further embodiments, the aliphatic carboxylic acid may include at least 12 carbons, or at least 14 carbons, or at least 16 carbons, or at least 18 carbons. In one embodiment, the aliphatic carboxylic acid may comprise stearic acid. While stearic acid is often used in downstream rubber compounding and rubber vulcanization, using stearic acid upstream prior to solvent removal for increasing Mooney viscosity and reducing tackiness was unknown and unexpected.

The aliphatic carboxylic acid may be added to the polymerization reactor or in another mixer downstream of the reactor. In one or more embodiments, the aliphatic carboxylic acid (e.g., stearic acid) may be added in a molten form at a temperature of at least 50° C., or at least 60° C. Additionally, it is contemplated that the aliphatic carboxylic acid may be delivered in a solution with one or more stabilizing agents described above (e.g., alkyltriethoxysilane), steam, or both. Upon addition of the aliphatic carboxylic acid, the alkoxysilane functionalized polymer and the aliphatic carboxylic acid may react for a sufficient time to complete the reaction, for example, about 0.05 to about 2 hours.

Subsequently, solvent is then removed from the alkoxysilane functionalized polymer. Various solvent removal processes, such as steam desolventization, drum drying, extruder or kneader devolitalization may be utilized to remove the solvent.

Without being bound by theory, the addition of the aliphatic carboxylic acid (e.g., stearic acid) reduces the tackiness of the alkoxysilane functionalized polymer. In one or more embodiments, the addition of aliphatic carboxylic acid reduces the adhesive energy of the alkoxysilane functionalized polymer to metal (e.g., stainless steel) to a level of less than 1000 gram-force millimeters (gf·mm), or less than 750 gf·mm, or less than 500 gf·mm. These adhesive energy values may be measured using the Tack Test Method described below. Additionally, the aliphatic carboxylic acid increases the Mooney viscosity of the alkoxysilane functionalized polymer. In one or more embodiments, the Mooney viscosity may increase by 5, or by 10, or by 20, or by 25 due to the addition of the aliphatic carboxylic acid.

Rubber Compositions

Next, the polymers detailed above may be included in rubber compositions for tire and non-tire applications. The rubber composition may include at least one curative, and at least one reinforcing filler.

Curative

As used herein, curatives are vulcanizing agents used in the vulcanization of the functionalized copolymer. In one or more embodiments, the curative includes a sulfur-based curative or a peroxide-based curative. Examples of specific suitable sulfur curatives include "rubbermaker's" soluble sulfur; sulfur donating curing agents, such as an amine disulfide, polymeric polysulfide, or sulfur olefin adducts; and insoluble polymeric sulfur. In one embodiment, the sulfur curative comprises soluble sulfur or a mixture of soluble and insoluble polymeric sulfur. For a general disclosure of suitable curatives and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. While various amounts are contemplated, the curatives may be used in an amount ranging from 0.1 to 10 phr, including from 1 to 7.5 phr, including from 1 to 5 phr, and preferably from 1 to 3.5 phr.

Reinforcing Filler

As used herein, "reinforcing filler" may refer particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively, "reinforcing filler" can also be used to refer to a particulate material that has a particle size of about 10 nm to about 50 nm.

In one or more embodiments, the reinforcing filler may comprise silica, carbon black, or combinations thereof.

Various carbon black compositions are considered suitable. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments, the rubber composition includes a mixture of two or more of the foregoing carbon blacks.

Various amounts of carbon black are contemplated. In one or more embodiments, the total amount of the reinforcing carbon black filler is 5 to about 175 phr, including 5 to 175 phr, about 5 to about 150 phr, 5 to 150 phr, about 5 to about 100 phr, 5 to 100 phr, or about 10 to about 200 phr, including 10 to 200 phr, about 20 to about 175 phr, 20 to 175 phr, about 20 to about 150 phr, 20 to 150 phr, about 25 to about 150 phr, 25 to 150 phr, about 25 to about 100 phr, 25 to 100 phr, about 30 to about 150 phr, 30 to 150 phr, about 30 to about 125 phr, 30 to 125 phr, about 30 to about 100 phr, 30 to 100 phr, about 35 to 150 phr, 35 to 150 phr, about 35 to about 125 phr, 35 to 125 phr, about 35 to about 100 phr, 35 to 100 phr, about 35 to about 80 phr, and 35 to 80 phr. The carbon blacks utilized can be in pelletized form or an unpelletized flocculent mass. For more uniform mixing in the rubber composition, unpelletized carbon black may be used in some embodiments.

Moreover, silica filler may also be used as a reinforcing filler. Examples of reinforcing silica fillers suitable for use include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of the first-third embodiments disclosed herein include, but are not limited to, aluminum silicate, magnesium silicate ($Mg_2SiO_4$, $MgSiO_3$ etc.), magnesium calcium silicate ($CaMgSiO_4$), aluminum calcium silicate ($Al_2O_3.CaO_2SiO_2$, etc.), and the like.

Like the carbon black, various amounts of silica are contemplated for use as reinforcing filler. In one or more embodiments, the total amount of the reinforcing silica filler or silica filler may be about 5 to about 175 phr, including 5 to 175 phr, about 5 to about 150 phr, 5 to 150 phr, about 5 to about 100 phr, 5 to 100 phr, or about 10 to about 200 phr, including 10 to 200 phr, about 20 to about 175 phr, 20 to 175 phr, about 20 to about 150 phr, 20 to 150 phr, about 25 to about 150 phr, 25 to 150 phr, about 25 to about 100 phr, 25 to 100 phr, about 30 to about 150 phr, 30 to 150 phr, about 30 to about 125 phr, 30 to 125 phr, about 30 to about 100 phr, 30 to 100 phr, about 35 to 150 phr, 35 to 150 phr, about 35 to about 125 phr, 35 to 125 phr, about 35 to about 100 phr, 35 to 100 phr, about 35 to about 80 phr, and 35 to 80 phr.

In other embodiments, the rubber composition may comprise at least one reinforcing filler other than carbon black or silica, or alternatively in addition to reinforcing carbon black and reinforcing silica fillers. Non-limiting examples of suitable such reinforcing fillers for use in the rubber compositions disclosed herein include, but are not limited to, aluminum hydroxide, talc, alumina ($Al_2O_3$), aluminum hydrate ($Al_2O_3H_2O$), aluminum hydroxide ($Al(OH)_3$), aluminum carbonate ($Al_2(CO_3)_2$), aluminum magnesium oxide ($MgOAl_2O_3$), pyrofilite ($Al_2O_34SiO_2.H_2O$), bentonite ($Al_2O_3.4SiO_2.2H_2O$), mica, kaolin, glass balloon, glass beads, calcium oxide (CaO), calcium hydroxide ($Ca(OH)_2$), calcium carbonate ($CaCO_3$), magnesium carbonate, magnesium hydroxide ($Mg(OH)_2$), magnesium oxide (MgO), magnesium carbonate ($MgCO_3$), potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof. When at least one reinforcing filler other than or alternatively in addition to reinforcing carbon black filler and reinforcing silica filler) is present, the total amount of all reinforcing fillers is about 5 to about 200 phr including 5 to 200 phr). In other words, when at least one reinforcing filler is present in addition to carbon black silica or both, the amount of any reinforcing carbon black filler and reinforcing silica filler is adjusted so that the total amount of reinforcing filler is about 5 to about 200 phr (including 5 to 200 phr).

Additional Rubber

In further embodiments, the rubber composition may comprise an additional rubber component comprising natural rubber, synthetic rubber, or combinations thereof. For example, and not by way of limitation, the synthetic rubber may comprise synthetic polyisoprene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, or combinations thereof.

Additional Additives

Optionally, a silane coupling agent may be blended with the silica reinforcing filler further improve the reinforcing properties. For example, the silane coupling agent may include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxy silane, 3-mercaptopropyltriethoxy silane, 2-mercaptoethyltrimethoxy silane, 2-mercaptoethyltriethoxy silane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyl dimethoxymethyl silane, dimethoxymethylsilylpropyl-N,N-dimethylthiocarbamoyl tetrasulfide, dimethoxymethylsilylpropyl benzothiazole tetrasulfide and the like. These silane coupling agents may be used alone or in a combination of two or more.

Useful processing or extender oils may also be included. Such oils include those that are commercially available as paraffinic, aromatic, or naphthenic oils. In one or more embodiments, the major constituent of the oil is naphthenic. The rubber compositions may also include other additives such as anti-ozonants, waxes, scorch inhibiting agents, processing aids, zinc oxide, tackifying resins, reinforcing resins, fatty acids such as stearic acid, peptizers, and one or accelerators.

The anti-ozonants may comprise N,N'disubstituted-p-phenylenediamines, such as N-1,3-dimethylbutyl-N'phenyl-p-phenylenediamine (6PPD), N,N'-Bis(1,4-dimethylpently)-p-phenylenediamine (77PD), N-phenyl-N-isopropyl-p-phenylenediamine (IPPD), and N-phenyl-N'-(1,3-dimethylbutyl)-p-phenylenediamine (HPPD). Other examples of anti-ozonants include, Acetone diphenylamine condensation product (Alchem BL), 2,4-Trimethyl-1,2-dihydroquinoline (TMQ), Octylated Diphenylamine (ODPA), and 2,6-di-t-butyl-4-methyl phenol (BHT).

The curing accelerators may include amines, guanidines, thioureas, thiols, thiurams, sulfonamides, dithiocarbamates and xanthates which are typically added in amounts of from about 0.2 to about 10 phr. The curing accelerators may include, but are not limited to, dithiocarbamate accelerators, including the metal dialkyldithiocarbamates such as, for example, zinc dibutyldithiocarbamate (ZDBDC), zinc diethyldithiocarbamate, zinc dimethyldithiocarbamate, and ferric dimethyldithiocarbamate; thiazole accelerators including 2-mercaptobenzothiazole, the benzothiazole disulfides such as, for example, mercaptobenzothiazole disulfide (MBTS); the benzothiazole sulfenamides, such as, for example, n-cyclohexyl-2-benzothiazole sulfenamide; and sulfenamide accelerators such as, for example, t-butyl-2-benzothiazyl sulfenamide (TBBS). Additionally, the curing accelerators may include diphenyl guanidine (DPG).

The rubber compositions may include at least 3 parts by weight filler per 1000 parts rubber (phr), or about 5 to about 1000 phr, or about 20 to about 80 phr, or about 30 to about 50 phr. The rubber compositions may also include from about 0 to about 80 parts processing or extender oil per 100 parts by weight rubber, or from about 5 to about 50 phr, or from about 10 to about 30 phr.

Of the total hundred parts rubber, the functional copolymer may include from about 20 to about 100 parts of the 100 total, or about 25 to about 75 parts of the 100 total, 30 to about 60 parts of the 100 total.

The rubber composition may be obtained by milling with a milling machine such as rolls, an internal mixer or the like, which can be shaped and vulcanized for use in tire applications such as a tire tread, an under tread, a carcass, a sidewall, a bead and the like as well as a rubber cushion, a belt, a hose and other industrial products, but it is particularly suitable for use in the tire tread.

The embodiments of the present disclosure are further illustrated by reference to the following examples.

EXAMPLES

Example 1

To a batch reactor, 42.88 kg of hexane solvent was added at 14.32 kg/min, and 35.37 kg of styrene monomer at 32.7% by weight concentration was added at 11.77 kg/min. The mixture is agitated. Then, 100.38 kg of 1,3-butadiene monomer at 21.4% by weight concentration was added to the reactor at 16.72 kg/min. The temperature is stabilized at 37.78° C. Next, 0.606 kg of 3% by weight n-butyllithium (BuLi) anionic polymerization catalyst was added to the batch reactor. Then, 4.4 ml of oligomeric oxolanyl propanes randomizer is added at 100.0% concentration, and 23.0 mL of potassium t-amylate is added at 15.0% by weight concentration. The mixture was allowed to react and reach its peak temperature, and coolant was added when the mixture reached 82.2° C. Next, a sample of the reactive cement into a 1 L bottle.

To the 1 L bottle, 37.0 mL of 37.0 mL of Sila-Ace S340 (N-(1,3-dimethylbutylidene)-3-(triethoxysilyl)-1-propanamine) produced by Chisso Corporation was added at 100.0% concentration, and a solution of stearic acid and octyltriethoxysilane was added to the 1 L bottle. The stearic acid was added at an amount of 1 g per hundred grams monomer (1 molar equivalent relative to the BuLi).

Example 2

Example 2 was produced by the same process as Example 1 with the exception of the concentration of the stearic acid added in the solution of stearic acid and octyltriethoxysilane. The stearic acid was added at an amount of 2 g per hundred grams monomer (2 molar equivalents relative to the BuLi).

Example 3

Similarly, Example 3 was produced by the same process as Examples 1 and 2 with the exception of the concentration of the stearic acid added in the solution of stearic acid and octyltriethoxysilane. The stearic acid was added at an amount of 3 g per hundred grams monomer (3 molar equivalents relative to the BuLi).

Comparative Example

In comparison to Examples 1-3, the Comparative Example utilizes the same process as Examples 1-3, but does not utilize stearic acid. Instead, the comparative example uses a solution of 2-ethylhexanoic acid and octyltriethoxysilane was added to the 1 L bottle.

TABLE 1

Polymer Properties of the Comparative Example

| Properties | Units | Target | Minimum | Maximum | ASTM Method |
|---|---|---|---|---|---|
| Volatile Matter | Wt. % | — | — | 0.75 | D5668 |
| Bound Styrene | Wt. % | 38.0 | 36.5 | 39.5 | D5775 |
| Vinyl | Wt. % | 26.0 | 23.0 | 29.0 | |
| Gum Mooney Viscosity | (ML/4/ 212° F.), unmassed | 65.0 | 50.0 | 90.0 | D1646 |

TABLE 2

Properties of Examples 1-3

| Batch | Equivalents of Stearic Acid | Bound Styrene | Vinyl Content | Blend Tank Mooney Viscosity $ML_4$ | Dried Mooney Viscosity $ML_4$ | Mooney Increase due to Stearic Acid Addition (Dried Mooney Viscosity-Blend Tank Viscosity) |
|---|---|---|---|---|---|---|
| Example 1 | 1.0 | 36.84 | 28.54 | 40.06 | 66.00 | 25.94 |
| Example 2 | 2.0 | 35.86 | 28.23 | 40.20 | 66.68 | 26.48 |
| Example 3 | 3.0 | 35.8 | 29.60 | 37.63 | 67.70 | 30.07 |

The Example 1-3 and Comparative Example polymer compositions were then incorporated rubber compounds. In Table 2, the blend tank viscosity "Blend Tank Mooney Viscsosity" is the Mooney Viscosity after the addition of the Sila-Ace S340 (alkoxysilane), and the "Dried Mooney Viscosity" is the Mooney viscosity after stearic acid addition. As shown, the stearic acid resulted in a Mooney increase of at least 25 in all of the samples. The rubber compounds were produced by a three stage mixing process. In the first stage, the components listed in Table 3 below were mixed in a Banbury mixer to form a masterbatch. Specifically, the components listed in Table 3 were mixed until a minimum temperature of 165° C. was obtained.

TABLE 3

First Stage Mixing Components

| Component | Phr |
|---|---|
| Polymer of Comparative Example or Polymer of Examples 1-3 | 80 |
| Natural rubber | 20 |
| Carbon Black | 5 |
| Silica | 50 |
| Silane | 5 |
| Black oil | 10 |
| Stearic acid | 2 |

Next, the masterbatch mixture produced from the first mixing stage underwent a second mixing until a minimum temperature of 150° C. was obtained. No additional components were added at this stage. This second mixing stage is often called the remix or remill stage.

The third and final mixing stage involved the mixing of the following components listed in Table 4 below until a temperature of 110° C. was reached.

| Component | phr |
|---|---|
| Masterbatch | 172.0 |
| Sulfur | 1.5 |

-continued

| Component | phr |
|---|---|
| TBBS | 2.5 |
| DPG | 1.4 |
| Santoflex ™ 6PPD | 1.0 |
| Zinc Oxide | 2.5 |
| Total | 180.9 |

The resultant rubber compounds produced in the third stage were then analyzed according to the metrics listed in Table 5 below.

TABLE 5

Further Properties of Examples 1-3

| | Properties | Comparative Example | Example 1 | Example 2 | Example 3 |
|---|---|---|---|---|---|
| Rolling Resistance | Tan δ @ 65° C. | 0.108 | 0.094 | 0.083 | 0.083 |
| | Index | 100 | 113 | 123 | 123 |
| Wet Skid Resistance | Tan δ @ 0° C. | 0.434 | 0.367 | 0.374 | 0.405 |
| Durometer | Shore A Hardness | 69.0 | 64.0 | 66.0 | 66.0 |
| Stress/Strain | Tensile (MPa) | 11.6 | 14.0 | 14.3 | 12.1 |
| | % Elongation | 268 | 321 | 306 | 274 |
| Tear Resistance | Die C @ RT | 6.65 | 5.82 | 6.19 | 5.28 |
| Rheometer | Minimum Torque (ML), lb-in | 8.7 | 8.9 | 8.2 | 8.3 |
| | Maximum Torque (MH), lb-in | 47.1 | 45.9 | 48.0 | 48.7 |
| | Tc10, min | 6.3 | 6.1 | 5.2 | 4.8 |
| | Tc50, min | 7.9 | 7.8 | 6.5 | 6.2 |
| | Tc90, min | 8.9 | 8.9 | 7.5 | 7.2 |
| Compound Mooney viscosity | $ML_{1+4}$ | 72.6 | 76.5 | 71.3 | 72.0 |

As shown in the data of Tables 2 and 5, the properties of Examples 1-3, which used the stearic acid to control condensation, is comparable to the properties of the Comparative Example, which used 2-ethyl hexanoic acid to control condensation. Specifically, the stearic acid Examples 1-3 achieved comparable viscosity control as the Comparative Example. However, as shown below, the stearic acid Examples 1-3 achieve much less tack than the Comparative Example.

Tack is measured with a rheometer for the above samples using the following Tack Test Method. Specifically, test samples of Examples 1-3 and the Comparative Example were individually added to the bottom of a container. The tack test probe, which was coaxially disposed inside the container, includes a cylindrical rod having a stainless steel metal disk at its lower end. The tack test probe was lowered at constant rate such that the metal disk contacted the individual samples. After contacting the samples, the tack test probe was raised at a constant rate to be pulled apart from each sample. The rheometer computed the normal force required to pull the tack test probe from each sample and the adhesive energy between the metal disk and the samples.

Figure 2:
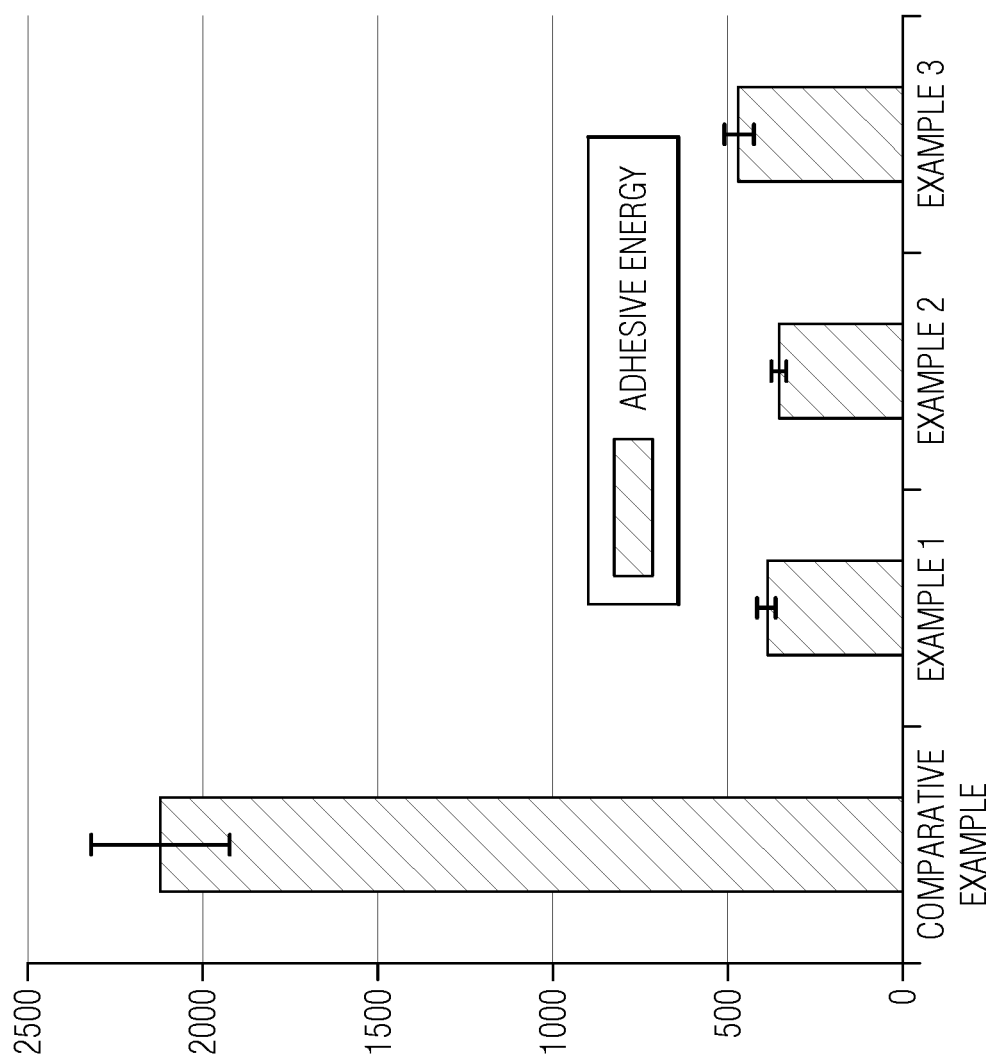
FIG. 2 is a graphical illustration of adhesive energy between styrene butadiene (SBR) copolymer samples and a metal disk in accordance with the Tack Test Method described herein.

As shown in FIG. 1, significant normal force is required to dissociate the Comparative Example sample from the metal disk of the tack test probe, whereas the inclusion of the stearic acid in Examples 1-3 greatly minimize the normal force required to dissociate the samples of Examples 1-3 from the metal disk. Referring to FIG. 2, the Comparative Example sample demonstrates over 4 times the adhesion energy to the metal disk relative to the samples of Examples 1-3. Thus, the stearic acid greatly reduced the adhesion energy (i.e., the tack) between the polymer samples and the metal disk, thereby greatly minimizing the normal force needed to dissociate the metal disk of the tack test probe from the samples. This reduced tack reduces the likelihood of massing, fouling, and plugging during the rubber manufacturing process.

Testing Methods

Mooney Viscosity (Compound Mooney and Gum Mooney): The Mooney viscosities of polymers disclosed herein were determined at 100° C. using an Alpha Technologies Mooney viscometer with a large rotor, a one minute warm-up time, and a four minute running time. More specifically, the Mooney viscosity was measured by preheating each polymer to 100° C. for one minute before the rotor starts. The Mooney viscosity was recorded for each sample as the torque at four minutes after the rotor started. Torque relaxation was recorded after completing the four minutes of measurement.

Fourier Transform Infrared Spectroscopy (FTIR)

The microstructures (cis, trans and vinyl contents) of the polymers were determined by FTIR. Specifically, the samples are dissolved in $CS_2$ and subjected to FTIR on a Perkin Elmer Spectrum GX instrument.

Viscoelastic Properties: Viscoelastic properties of cured rubber compounds were measured by a temperature sweep test conducted with an Advanced Rheometric Expansion System (ARES) from TA Instruments. The test specimen had a rectangular geometry having a length of 47 mm, a thickness of 2 mm, and a width of 12.7 mm. The length of specimen between the grips on the test machine, i.e., the gap, is approximately 27 mm. The test was conducted using a frequency of 62.8 rad/sec. The temperature is started at −100° C. and increased to 100° C. The strain is 0.1% or 0.25% for the temperature range of −100° C. to −10° C., and 2% for the temperature range of −10° C. and above.

Tensile Properties: Tensile mechanical properties were determined following the guidelines, but not restricted to, the standard procedure described in ASTM D412, using micro dumbbell specimens with a dimension of 4 mm in width and 1.91 mm in thickness. A specific gauge length of 44 mm was used for the tensile test. Specimens were strained at a constant rate and the resulting force was recorded as a function of extension (strain). Force readings were expressed as engineering stresses by reference to the original cross-sectional area of the test piece. The specimens were tested at 23° C. The same tensile mechanical properties were also tested at 100° C. Maximum stress and maximum strain percentage were also measured at both temperatures.

Vulcanization Time Calculations

The Tc10, Tc50, and Tc90, which is the time wherein 10%, 50%, and 90% of the vulcanization of the rubber compound is completed and measured using a Moving Die Rheometer using ASTM D-5099.

Tear Resistance

Tear properties of milled 45 mil flat rubber sheets cut with a die C (90° angle die) were determined in accordance with ASTM Method D-624. Die C tear specimens were not nicked prior to testing. Tear resistance, in kg/cm, was obtained using a table model Instron® Tester, Model 1130 and the test results were calculated in accordance with ASTM Method D-624. Testing was again carried out at room temperature (23° C.).

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A method of preparing an alkoxysilane functionalized polymer, the method comprising:
   i. introducing an anionic polymerization initiator to a reactor comprising a reactive mixture including conjugated diolefin monomer and solvent to form a living polymer via anionic polymerization;
   ii. introducing alkoxysilane to the reactor to react with the living polymer to form an alkoxysilane functionalized polymer;
   iii. prior to any optional water contact, adding stearic acid to the alkoxysilane functionalized polymer; and
   iv. after adding the stearic acid, removing solvent from the alkoxysilane functionalized polymer,
   wherein the addition of the stearic acid increases the Mooney viscosity of the alkoxysilane functionalized polymer by at least 25; and
   wherein the addition of the stearic acid reduces tack in the alkoxysilane functionalized polymer such that the alkoxysilane functionalized polymer has an adhesive energy of less than 1000 gf·mm.

2. The method of claim 1 wherein the conjugated diolefin monomer comprises 1,3 butadiene, isoprene, myrcene, or combinations thereof.

3. The method of claim 1 wherein the reactive mixture further comprises vinyl aromatic hydrocarbons.

4. The method of claim 3 wherein the vinyl aromatic hydrocarbons comprise styrene, alpha methyl styrene, or combinations thereof.

5. The method of claim 1 wherein the stearic acid is added to the reactor or in another mixer downstream of the reactor.

6. The method of claim 1 further comprising adding at least one polymer modifier to the reactor, wherein the polymer modifier comprises cyclic oligomeric oxolanyl alkanes, potassium t-amylate, or both.

7. The method of claim 1 further comprising adding antioxidant.

8. The method of claim 7, wherein the antioxidant is added to the reactor or another mixer downstream of the reactor.

9. The method of claim 1, further comprising adding a silane stabilizing agent.

10. The method of claim 1, wherein the polymerization initiator is a lithium catalyst.

11. The method of claim 1, wherein the alkoxysilane is selected from 3-(1,3-dimethylbutylidene)aminopropyltriethoxysilane, tetraethylorthosilicate, 3-glylcydiylpropyltrimethoxysilane, 3-glycydiylpropylmethyldimethoxysilane or combinations thereof.

12. The method of claim 1, wherein the alkoxysilane functionalized polymer is an alkoxysilane functionalized styrene butadiene copolymer.

13. The method of claim 1, wherein the addition of the stearic acid includes adding at least 1 g per 100 g of the conjugated diolefin monomer of the stearic acid.

* * * * *